(12) United States Patent
Henshaw et al.

(10) Patent No.: US 7,703,976 B2
(45) Date of Patent: Apr. 27, 2010

(54) SENSOR APPARATUS

(75) Inventors: David Geoffrey Henshaw, Derbyshire (GB); Susan Janet Riley, Derby (GB)

(73) Assignee: ROLLS-ROYCE PLC (GB)

( * ) Notice: Subject to any disclaimer, the term of this patent is extended or adjusted under 35 U.S.C. 154(b) by 0 days.

(21) Appl. No.: 12/177,367

(22) Filed: Jul. 22, 2008

(65) Prior Publication Data
US 2009/0046762 A1 Feb. 19, 2009

(30) Foreign Application Priority Data
Aug. 14, 2007 (GB) ................................ 0715768.8

(51) Int. Cl.
*G01K 7/00* (2006.01)
*G01K 13/00* (2006.01)
*G01K 3/00* (2006.01)

(52) U.S. Cl. ........................ 374/179; 374/110; 374/166; 374/115; 374/144; 374/148

(58) Field of Classification Search ................. 374/111, 374/112, 113, 110, 115, 179, 166, 144, 148
See application file for complete search history.

(56) References Cited

U.S. PATENT DOCUMENTS

| | | | | |
|---|---|---|---|---|
| 3,623,367 A | * | 11/1971 | Benefict | 73/300 |
| 4,186,605 A | * | 2/1980 | Bourigault | 374/115 |
| 5,106,203 A | * | 4/1992 | Napoli et al. | 374/144 |
| 5,249,864 A | * | 10/1993 | Fagan et al. | 374/110 |
| 6,123,675 A | * | 9/2000 | Kreizman et al. | 600/549 |
| 6,425,687 B1 | * | 7/2002 | Kulczyk | 374/115 |
| 2001/0013773 A1 | | 8/2001 | Aigner et al. | |
| 2008/0291964 A1 | * | 11/2008 | Shrimpling et al. | 374/1 |

FOREIGN PATENT DOCUMENTS

EP 0653690 A1 10/1994
GB 2226423 A 6/1990

* cited by examiner

*Primary Examiner*—Gail Verbitsky
*Assistant Examiner*—Mirellys Jagan
(74) *Attorney, Agent, or Firm*—McCormick, Paulding & Huber LLP

(57) ABSTRACT

A sensor apparatus including a plurality of sensors, and a measurement device. The plurality of sensors being divided into sensor groups with each sensor group having a number of sensors. The groups being arranged such that the sensor groups are electrically matched. The sensors in a sensor group coupled in parallel with each other to form a sensor ladder. A measurement device is arranged to compare electrical signals from each sensor group and to output an indication signal, wherein the measurement device is coupled to each sensor ladder at an intermediate position and in that the coupling position of each sensor ladder are electrically equivalent to one another. Also provided by the present invention is a method of monitoring a plurality of sensors.

14 Claims, 1 Drawing Sheet

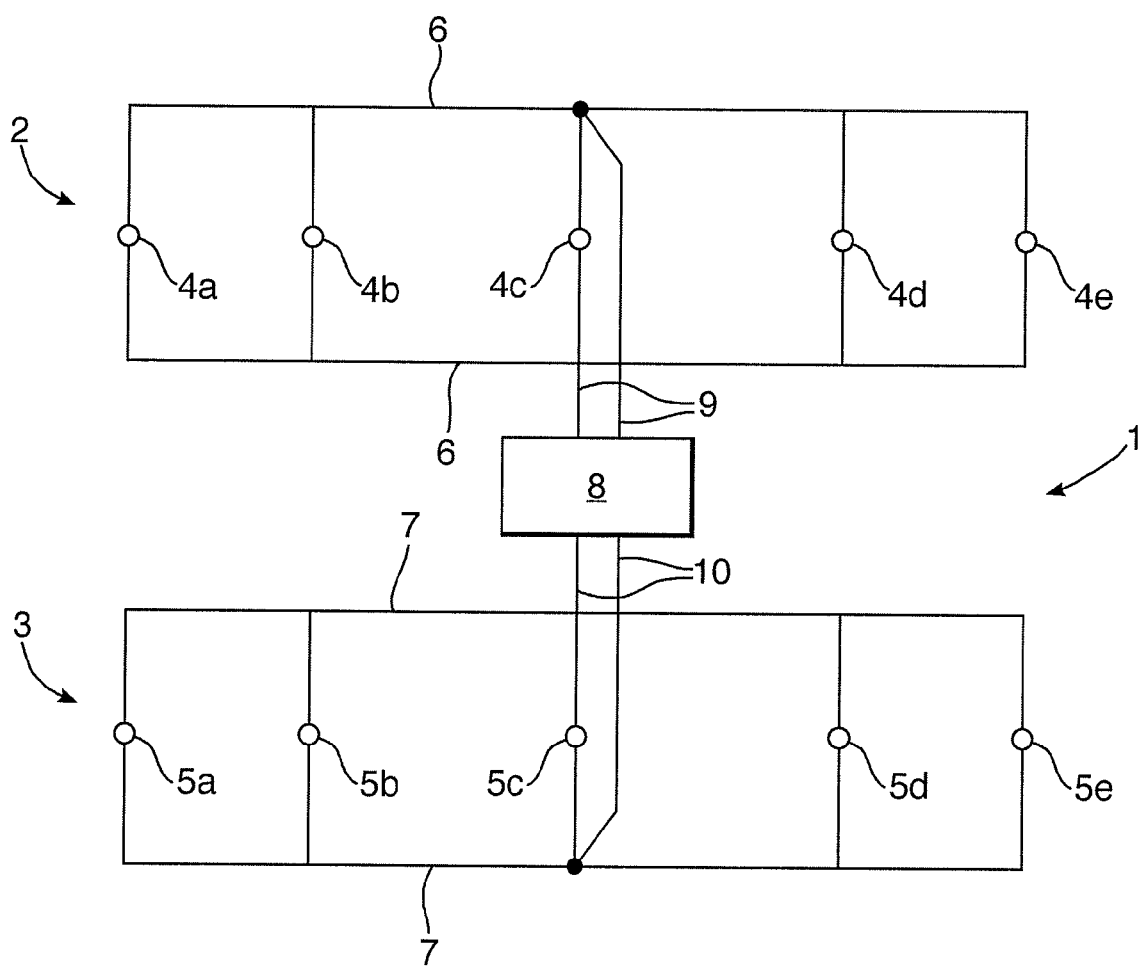

SENSOR APPARATUS

CROSS REFERENCE TO RELATED APPLICATION

This application is entitled to the benefit of British Patent Application No. GB 0715768.8 filed on Aug. 14, 2007.

FIELD OF THE INVENTION

The present invention relates to sensor apparatus and more particularly to sensor apparatus and methods of operating sensor apparatus in gas turbine engines.

BACKGROUND OF THE INVENTION

It will be understood within such machinery as gas turbine engines it is necessary to monitor a number of conditions in order to maintain operational efficiency. It will be appreciated that these conditions may relate to current output from the machinery, its temperature or other operational conditions such as stress loading. In such circumstances sensors are provided within and about the machinery such as a gas turbine engine in order to provide responses to control apparatus or indicator displays or otherwise for utilisation within the overall control strategy for the machinery.

With regard to engines it will be appreciated that some conditions are operationally critical. Thus, it is important that the engine or machinery remains within operational parameters such that the machinery will not malfunction or catastrophically fail. In such circumstances it is known to provide a number of sensors to effectively repeat or provide redundancy with regard to sensor determinations or averaging. These sensors are arranged in sensor channels extending about the machinery. For example within a gas turbine engine it is known to provide a sensor ladder having a number of thermo couples connected in parallel such that the responses from the thermo couples can be combined and monitored by a measurement device. Typically, this sensor ladder as indicated has the sensors, that is to say the thermocouples, connected in parallel such that measurement signals or readings can be taken from the respective ends of the sensor ladder. In such circumstances, the measurement system can determine if there is a disparity between the sensor signals at each end of the sensor ladder and so highlight a potential error. Unfortunately, some sensor failures may not result in appropriate disparity or differences in the signal at respective ends of the channel (sensor ladder).

It will be appreciated if signals received at each end of the sensor ladder agree within a predetermined threshold amount then the average of the two is used as indication signals for subsequent control or indication purposes. However, by having all sensors connected in a single parallel ladder, it will be understood that a single sensor or connecting harness failure will affect the whole system and it is not always possible, even with dual channel measurement of the ladder to establish that there is even a fault. If a difference beyond the threshold level between the channels occurs then it is not possible to determine which of the sensor channels is correct. It will be understood that measurement from the ends of each sensor ladder is also not an accurate assessment of the average sensor signal values. The sensor signals presented to the measurement device in the ladder are typically biased towards the sensors nearer to the end of the ladder as the electrical connections in the ladder provide an electrical resistance which is not negligible compared with sensor electrical resistance.

For the above reasons previous sensor apparatus and methods of monitoring sensors although mostly acceptable can provide spurious results.

SUMMARY OF THE INVENTION

Aspects of the present invention provide a sensor apparatus that includes a plurality of sensors and a measurement device. The plurality of sensors are divided into sensor groups, with each sensor group having a number of sensors, and the sensor groups are arranged such that the sensor groups are electrically matched, with the sensors in a sensor group coupled in parallel to each other to form a sensor ladder. The measurement device is arranged to compare electrical signals from each sensor group and to output an indication signal, characterised in that the measurement device is coupled to each sensor ladder at an intermediate position and in that the coupling position of each sensor ladder are electrically equivalent to one another.

Also in accordance with aspects to the present invention, there is provided a method of monitoring a plurality of sensors including the steps of allocating each sensor to a sensor group, electrically matching the sensor groups, coupling the sensors in a sensor group in parallel with each other to form a sensor ladder, comparing electrical signals received by a measurement device from each sensor group and outputting an indication signal. The present method is characterised by coupling the measurement device to the sensor ladders at an intermediate position and by the coupling position of each sensor ladder being electrically equivalent to one another.

Typically, the sensor groups are electrically matched by the provision of an equal number of sensors in each sensor group or by providing substantially equal spacing of the sensors on each sensor ladder.

Typically, there are two sensor groups. Normally, the sensor groups are electrically isolated from each other.

Typically, the sensors are thermocouples.

Generally, the measurement device is biased to output a low voltage indication signal when a sensor, a sensor ladder or a coupling to the measurement device has an open circuit and/or a short circuit.

Typically, when the difference between the electrical signals from each sensor group is less than a sensor group threshold then the indication signal is an average of the electrical signals from each of the sensor groups. Typically, when the difference between the electrical signals from each sensor group is greater than a sensor group threshold then the indication signal comprises an average of the electrical signals from each of the sensor groups within the threshold and further comprises an error signal for each sensor group for which the electrical signal is outside the threshold. Generally, the sensor group threshold is determined by an expected scatter of the electrical signals from each of the sensors within each sensor group.

Typically, the measurement device is arranged to periodically measure the group signals from each sensor group to determine the difference in electrical signals.

Possibly, the measurement device is arranged to store a previous indication signal in a memory device as a stored indication signal. Typically, the measurement device is arranged to compare the stored indication signal with a present indication signal to determine whether the difference is within an indication signal threshold. When the difference is within the indication signal threshold then the indication signal is the present indication signal. When the difference exceeds the indication signal threshold then the indication signal is a proportionate average between the stored indication signal and the present indication signal.

Possibly, the indication signal threshold is altered in conformity with expected variations in the sensors and the electrical signals over an operational time period.

Preferably, the arrangement is included in a machine or a machine is operated according to the method.

Aspects of the present invention also include a gas turbine engine including an arrangement or operated with a method as described above.

BRIEF DESCRIPTION OF THE DRAWINGS

FIG. 1 is a simplified schematic illustration of a sensor apparatus provided by the present invention.

DETAILED DESCRIPTION OF THE PREFERRED EMBODIMENTS

As indicated above it is generally desirable to provide sensors in order to determine control and operational performance. Such sensors for example with regard to a gas turbine engine may be utilised in order to monitor TGT (Turbine Gas Temperature) margin and thrust control reliability in order to precisely achieve required power levels with optimised fuel burn. In such circumstances, as indicated, sensors such as thermocouples are located appropriately about the gas turbine engine in order to provide signals indicative of their condition to allow an indication and/or control function to be performed. It will be understood that there are other situations where a system may measure utilising a multiple number of sensors, which are electrically connected in parallel to obtain an average reading for those sensors. Averaging readings has advantages with respect to avoiding individual sensor reliability issues and failure limitations.

It will be understood that with a sensor apparatus, or method of monitoring, the sensor apparatus configuration will be such that common failure causes will result in a decrease in signal. By aspects of the present invention, a sensor apparatus is provided in which these sensors are divided into at least two sensor groups or channels such that there can be comparison between the sensor groups or channels. This comparison will determine differences, which then enable detection of a sensor or sensor group failure. In such circumstances, the arrangement and method of monitoring of the sensors will be more tolerant of individual faults with sensors and by appropriate configuration of a measurement device have an ability to identify a valid signal in the presence of a signal failure.

In a typical embodiment of a sensor apparatus, in accordance with aspects of the present invention, an even number of sensors are divided into two separate electrical groups with half of the sensors in each sensor group. It will be appreciated that this plurality of sensors can be divided into more than two groups provided the relative electrical load between the groups is known. However, two groups are most appropriate and simplify operation as well as explanation. Each sensor group has sensors connected in an approximately equally spaced parallel connection sensor ladder. Each parallel sensor ladder connects to a measurement device through a connection or coupling located intermediately along the sensor ladder. Typically, the connection from the measurement device to the sensor ladder is central such that to a certain extent the sensors within each individual sensor group in the form of a sensor ladder are symmetrical about the coupling from the measuring device. Equally, it could be stated that the sensor groups are electrically symmetrical or most preferably are equivalent to each other in terms of electrical response. In such circumstances, the measuring device has an enhanced sensitivity with regard to individual failure of respective sensors in each sensor group as well as failure of the connections in the sensor ladder between those sensors in each individual sensor group.

The respective sensor groups are effectively electrically isolated with respect to each other so that a fault in one sensor group does not affect the reading of the other sensor group. In such circumstances, the sensor group signals from the sensor group reflects that sensor group only.

Typically, the measurement device is arranged to provide a so called pulled low or exaggerated low in a typical fault condition, that is to say when there is an open-circuit or short-circuit fault in a sensor or connection in the sensor ladder or a sensor group or a coupling to the measurement device. In such circumstances, potentially greater differences are achieved in the electrical signals between sensor groups, which can be utilised in accordance with aspects to the present invention as described below.

The measurement device compares the group sensor signals from each sensor group. Respective group sensor signals are compared to each other and any differences identified and assessed relative to a sensor group threshold. If all the sensor group signals are within the sensor group threshold then the measurement device determines an average and presents that as an indication signal. However, if the sensor group signals have a difference or discrepancy greater than the acceptable sensor group threshold then typically those sensor group signals within the threshold will be averaged in order to provide the indication signal whilst an error signal will be generated for those sensor groups that provide a sensor group signal outside of the threshold.

The sensor group signal threshold will be chosen for particular instances. Thus, the threshold will provide a range typical of the differences based upon data scatter for sensors in normal use after averaging within each sensor group. It will be understood that inherently there will be some data scatter in view of tolerance-build within each sensor, location and position within the sensor ladders along with possible operational variations in terms of temperature differentials and unpredictable factors such as vibration and physical stressing. It will also be appreciated that sensors may age at different rates. In such circumstances it is to be expected that there will not be exact similarity in the sensor group signals determined by the measurement device and thus arrangements and methods in accordance with aspects of the present invention will accommodate for such variations.

Clearly, apparatus and methods in accordance with aspects of the present invention have particular applicability with regard to situations where a sensor or a sensor group in terms of the sensor ladder connections may fail for whatever reason. In such circumstances the measurement device utilised to determine the sensor group signals will be arranged to operate in accordance with a known rationale. As indicated, generally two sensor groups will be provided. If there is a difference or discrepancy between the electrical signals from the groups beyond the acceptable sensor group threshold then one group must be determined as faulty. In accordance with aspects of the present invention as indicated the measurement device or detector will be biased towards a low voltage value for at least predictable open-circuit and short-circuit fault situations. In such circumstances with simply two sensor groups, the higher of those groups will be considered as valid whilst an error flag signal will be raised with regard to the lower, assumed to be faulty, group.

In order to avoid radical or step changes in the indication signal, typically, the measurement device will incorporate a memory for storing a standard indication signal or a previous indication signal for comparison with a present indication signal. In such circumstances, if the present indication signal is within an indication signal threshold range from the stored indication signal, then the present indication signal may be utilised as an output for appropriate control or indicator devices. If the present indication signal is outside of a threshold range of the stored indication signal, then a number of possibilities are provided. These possibilities include raising an error flag to indicate the difference whilst utilising the present signal irrespectively. Alternatively, the present indication signal and the stored indication signal or signals may be averaged proportionately in order to provide an output from the measurement device. This averaging and proportionality may be biased towards the present indication signals provided at different time periods consecutively such that changes in the indication signal which are true and correct can be accommodated progressively and incrementally at least until within the indication signal threshold.

Averaging and proportionality will be utilised to avoid indicated step or radical changes in the value of the indication signal. By using averaging and proportionality, there will be a gradual shift rather than radical and step changes in value which may cause problems with regard to control regimes and presented indicators.

As indicated above generally, the sensor groups will be arranged such that there is known electrical difference between the groups which can then be accommodated in averaging and weighting the sensor group signals as monitored and received by the measurement device. However, for simplicity generally the sensor groups will be substantially equalised in terms of electrical impedance or otherwise in order to ensure that the threshold range provided can be set with some predictability. It will be understood that although there may be theoretical known electrical difference in terms of electrical status and character between sensor groups and that such known electrical difference can be used as a scaling factor for comparison within the threshold ranges, such scaling will also magnify or reduce the potential sensitivity of the arrangement and method to faults which could be detrimental unless carefully controlled and considered and so add complexity.

The geometry of the sensor groups will generally be arranged to be as simple and unambiguous as possible. FIG. 1 provides a schematic illustration of the sensor apparatus 1 in accordance with aspects of the present invention. Only two sensor groups 2, 3 are illustrated as this is the preferred arrangement and as indicated allows simplicity. It will be noted that each sensor group 2, 3 incorporates a plurality of sensors 4, 5. These sensors 4, 5 are arranged in a parallel relationship such that each sensor 4, 5 is associated with a sensor ladder 6, 7. In accordance with aspects of the present invention the respective ladder 6, 7 and therefore the sensor groups 2, 3 are effectively electrically isolated from each other.

In FIG. 1, a single measurement device 8 is illustrated and positioned at an intermediate physical location in the respective ladder 6, 7 connected by couplings 9, 10. By positioning the measuring device 8 centrally within the ladder 6, 7 it will be appreciated that variation of results between sensors 4c, 5c and sensors 4a, 5a, 4e, 5e will be reduced as indicated above. The electrical resistance of the connections in the ladder 6, 7 will not be negligible in comparison with sensors 4, 5 and therefore with prior arrangements, with the measuring devices at the ends of the ladders 6, 7, potentially spurious and biased results to sensors nearer to the measurement device can cause problems. Clearly, there may still be a variation between near and far sensors 4, 5 but nevertheless the problem is diminished.

Although a single measurement device 8 is depicted it will be appreciated that the device 8 may comprise a network of respective measurement devices networked together in order to provide an architecture for the measurement device in terms of comparison of the group sensor signals received from several sensor groups.

In a practical installation as indicated a number of sensors 4, 5 will be located appropriately within the machine. This machine may be a gas turbine engine and the sensors will be thermocouples for determining temperature changes within that gas turbine engine. The sensors 4, 5 will be divided into the sensor groups 2, 3 such that as indicated they are substantially electrically isolated from each other. By such electrical isolation faults and problems with one sensor group 2, 3 will not influence or affect results with the other sensor groups 2, 3. For operational purposes in accordance with the method and the arrangement redundancy is provided with regard to sensor results and therefore more robustness with regard to control and indicator functions is achieved using indication signals from the measurement device 8. The measurement device 8 will receive sensor group signals from the respective sensor group 2, 3 and compare them. The measurement device 8 will define a threshold. If the sensor group signals from the respective groups 2, 3 are within the threshold then generally an average will be taken and utilised as the indication signal output provided by the measurement device to other control or indicator functions.

Within the context of the measurement device 8, as indicated some sophistication with regard to determination of the indication signal as an output can be achieved. Thus, the method, as indicated, utilises a threshold range for determining whether both sensor group signals will be utilised in an averaged way to provide an indication signal as an output. If one sensor group signal is outside of the threshold range then the higher of the signals will be utilised as the measurement device will be biased towards a low voltage value for a short-circuit or open-circuit malfunction which is the most common form of malfunction within a sensor group 2, 3. It will be understood that the sensors 4, 5 may drift or otherwise provide spurious results with age or otherwise but the most significant factor is with regard to open-circuit or close-circuit malfunction. By biasing the measurement device 8 to a low voltage value in such conditions there can be a degree of statistical confidence that the higher value, and therefore the sensor group providing that higher value, will be correct.

In order to avoid radical step changes, the measurement device 8 will also generate and incorporate a degree of monitoring with regard to indication signal output. Radical changes in the indication signal output may provide spurious results in a control regime. Thus, the present indication signal, created by either averaging the sensor group signals from the groups 2, 3 or by determining one of those groups as the true value as a result of a failure in the other group, will be utilised as a present indication signal for comparison with stored or previous indication signals. An indication signal threshold will be established. When the value of the present indication signal and the stored indication signal are within that indication signal threshold range then dependent upon operational requirements an average of the two can be utilised or the present indication signal provided as an output.

The particular advantage of the use of an indication signal threshold is that step changes in the indication signal value used as an output can be avoided. In such circumstances, the measurement device 8 will typically be arranged to incorporate a memory to store at least the immediately previous indication signal. The measurement device 8 will be arranged to periodically and typically over a regular time period determine the sensor group signals from the groups 2, 3 in order to define an indication signal for comparison with the stored indication signals. By storing a number of prior determinations of the indication signals a smoothing effect with regard to changes in the indication signal output from the measurement device 8 can be achieved. Smoothing will avoid radical and step changes in the indication signal output from the measurement device 8.

By aspects of the present invention at least two separate electrical systems in terms of the sensor groups will be utilised. In such circumstances most common faults can be detected by comparison of the sensor groups. The arrangement and the method will allow and ensure that most common faults result in a low signal which as indicated allows the arrangement and method to determine which of the sensor groups is faulty and which should be utilised for ongoing operational purposes. By separating and dividing the sensors into appropriate sensor groups 2, 3 and through measurement from the sensor ladders at an intermediate and typically electrically central location on the sensor ladders a high degree of arrangement and method sensitivity and accuracy can be achieved with a reduction in scatter giving a greater confidence in the results from the sensor groups. With regard to a gas turbine engine this may be with respect to use of thermocouples as the sensors and therefore determination of an average temperature within the gas turbine engine. By being able to more accurately determine the temperature within the gas turbine engine further TGT margin control can be achieved and therefore fuel efficiencies and gas turbine life.

Aspects of the present invention can be utilised with regard to any arrangement or system of multiple sensors utilised for primary control functions or as indicators. Aspects of the present invention are not limited to aerospace applications or gas turbine engines. It will be understood that provision of redundancy with respect to the accuracy of sensor determinations may be applicable in a number of machines and particularly where those machines are safety critical. By providing sensor groups in accordance with aspects of the present invention determination between sensor groups, which are malfunctioning and those more likely to be true can be determined.

Aspects of the present invention can be used in any measurement system where multiple sensors, and in particular where those sensors are voltage sources, are connected in parallel to provide an average reading without modification. However, the system can also be utilised with most benefits for fault detecting and improved accuracy if the sensors are not output voltage sources such as resistance devices. However, with sensors which are not voltage sources it may not be possible to determine which channel sensor group is faulty and not all the failures will result in a low signal determinable by a measurement device in accordance with aspects of the present invention.

Modifications and alterations to aspects of the present invention will be understood by those skilled in the art. For example as indicated above at least two sensor groups, which are substantially electrically equivalent will be utilised. However, it would also be possible to use or define sensor groups which are not electrically equivalent and in particularly where the number of sensors in each sensor group is different but it would be necessary to have an accurate knowledge of the electrical difference between the sensor groups which can then be built in as a weighting or scaling factor in the measurement device for comparison purposes.

What is claimed is:

1. A sensor apparatus comprising:
   a plurality of sensors, divided into sensor groups, each sensor group including a number of sensors, the groups being arranged such that the sensor groups are electrically matched, the sensors in a sensor group being coupled in parallel with each other to form a sensor ladder,
   a measurement device arranged to compare electrical signals from each of the sensor groups and to output an indication signal, wherein the measurement device is coupled to each sensor ladder at an intermediate position and in that the coupling position of each sensor ladder are electrically equivalent to one another.

2. A sensor apparatus as claimed in claim 1 wherein the sensor groups are electrically matched by the provision of an equal number of sensors in each sensor group or by providing substantially equal spacing of the sensors on each sensor ladder.

3. A sensor apparatus as claimed in claim 1 wherein there are two sensor groups.

4. A sensor apparatus as claimed in claim 1 wherein the sensor groups are electrically isolated from each other.

5. A sensor apparatus as claimed in claim 1 wherein the sensors are thermocouples.

6. A sensor apparatus as claimed in claim 1 wherein the measurement device is biased to output a low voltage indication signal when a sensor, a sensor ladder or a coupling to the measurement device has an open circuit and/or a short circuit.

7. A sensor apparatus as claimed in claim 1 wherein when the difference between the electrical signals from each sensor group is less than a sensor group threshold then the indication signal is an average of the electrical signals from each of the sensor groups.

8. A sensor apparatus as claimed in claim 1 wherein when the difference between the electrical signals from each sensor group is greater than a sensor group threshold then the indication signal comprises an average of the electrical signals from each of the sensor groups within the threshold and further comprises an error signal for each sensor group for which the electrical signal is outside the threshold.

9. A sensor apparatus as claimed in claim 1 wherein the measurement device is arranged to store a previous indication signal in a memory device as a stored indication signal.

10. A sensor apparatus as claimed in claim 9 wherein the measurement device is arranged to compare the stored indication signal with a present indication signal to determine whether the difference is within an indication signal threshold.

11. A sensor apparatus as claimed in claim 10 wherein when the difference is within the indication signal threshold then the indication signal is the present indication signal.

12. A sensor apparatus as claimed in claim 10 wherein when the difference exceeds the indication signal threshold then the indication signal is a proportionate average between the stored indication signal and the present indication signal.

13. A gas turbine engine comprising:
   an air intake;
   a propulsive fan;
   a pressure compressor;
   a combustor;
   a turbine;
   an exhaust nozzle; and
   a sensor apparatus for measuring a gas turbine engine parameter, the sensor apparatus having a plurality of sensors divided into sensor groups, each sensor group including a number of sensors, the groups being arranged such that the sensor groups are electrically matched, the sensors in a sensor group being coupled in parallel with each other to form a sensor ladder, and a measurement device arranged to compare electrical signals from each of the sensor groups and to output an indication signal, wherein the measurement device is coupled to each sensor ladder at an intermediate position and in that the coupling position of each sensor ladder are electronically equivalent to one another.

14. A method of monitoring a plurality of sensors comprising the steps of:

allocating each sensor to a sensor group;

electrically matching the sensor groups;

coupling the sensors in a sensor group in parallel with each other to form a sensor ladder;

comparing electric signals received by a measurement device from each sensor group;

outputting an indication signal; and coupling the measurement device to the sensor ladders at an intermediate position; the coupling position of each sensor ladder being electrically equivalent to one another.

\* \* \* \* \*